VARIABLE-LENGTH SORT-DOCKETING WITH OUTRIGGER PUSHER

Filed Jan. 2, 1968 3 Sheets-Sheet 1

INVENTORS
RICHARD W. CARMAN
DEREK O. ORAM
BY
John J. McCormack
ATTORNEY

INVENTORS
RICHARD W. CARMAN
DEREK O. ORAM
BY
ATTORNEY

INVENTORS
RICHARD W. CARMAN
DEREK O. ORAM
BY
John J. McCormack
ATTORNEY

United States Patent Office 3,517,926

Patented June 30, 1970

3,517,926
VARIABLE-LENGTH SORT-DOCKETING WITH OUTRIGGER PUSHER

Derek O. Oram, Sudbury, and Richard W. Carman, Foxboro, Mass., assignors to Honeywell Inc., Minneapolis, Minn., a corporation of Delaware

Filed Jan. 2, 1968, Ser. No. 700,662
Int. Cl. B65h *31/00*
U.S. Cl. 271—86 13 Claims

ABSTRACT OF THE DISCLOSURE

An improved variable-length sort pocketing, or like document-stacking, arrangement for machines which handle and sort documents of widely-varying lengths, the arrangement including an adjustable-length stack transport/stop assembly in each stack area, together with a document stack pusher adapted to accommodate these various lengths and the corresponding adjustment positions of the transport/stop assembly, a pusher comprising, in one embodiment, a pusher plate having an "outrigger" extension, spanning the maximum document-length differential.

PROBLEMS, INVENTION FEATURES

Figure 1:
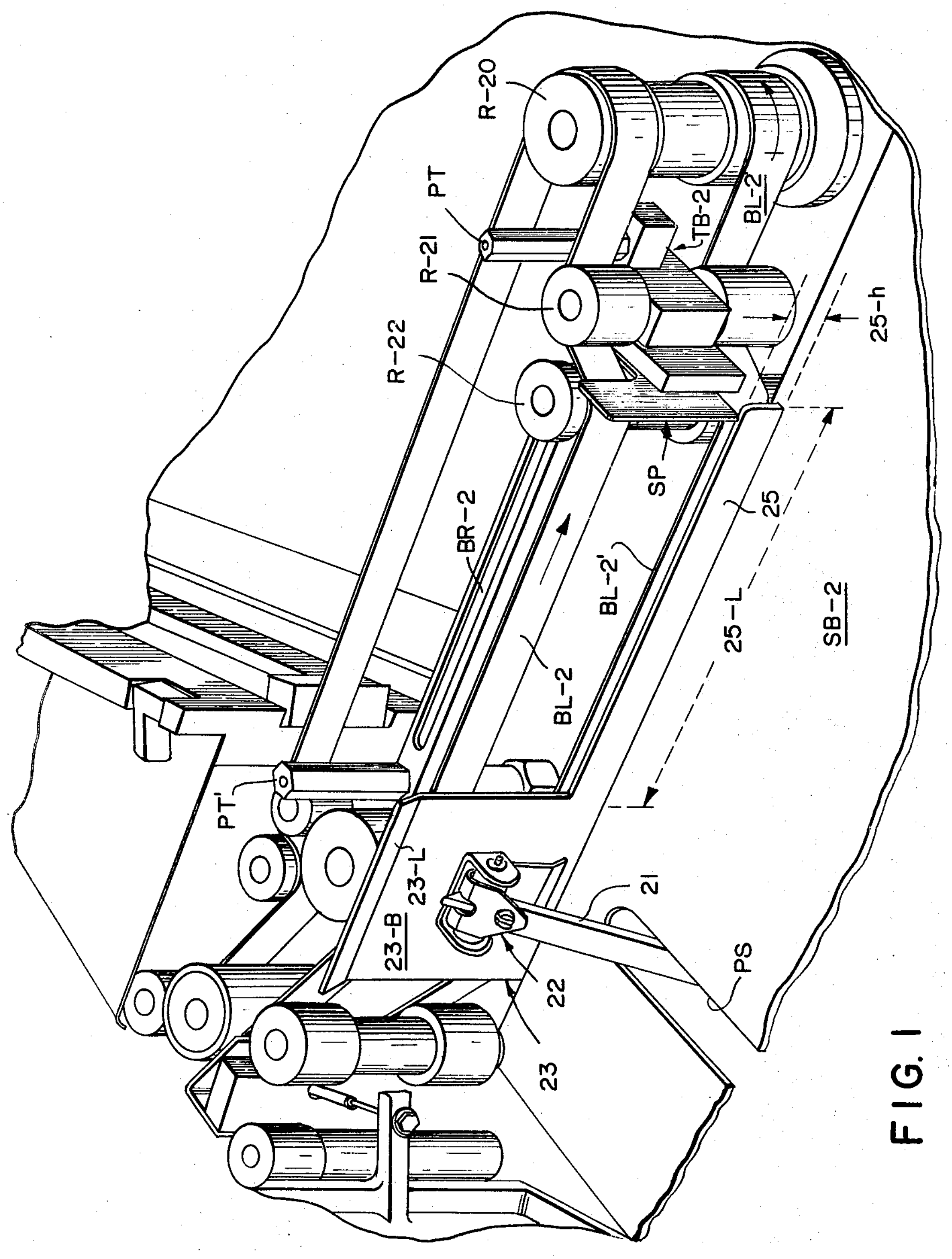

In the art of designing machines for transporting, manipulating and otherwise processing computer record media, workers are turning to the unit record document for many applications and these are becoming increasingly popular, such as for processing "returnable media" and the like. Thus, unit records are finding increased acceptance in the business world; for instance, taking the form of the familiar punched card, or of bar-encoded coupons or the like. Of course, unit record media and machines for manipulating them, antedate the automatic data processing arts, and over the many years have evolved into a rather bewildering array of document sizes, weights, etc. Unfortunately, this variety in document size has heretofore limited the application of electronic data processing techniques for solving the problem of processing them (such as for marking the documents, reading them, sorting them, etc.), since the disparate sizes cannot be processed at the extremely high handling speeds, commensurate with a typical rate of efficient, electronic data processing. For instance, a utility company may commonly use one size document, like a (detachable) punched card, for one purpose and use another much smaller document, such as flimsy MICR check or a mark-encoded paper receipt, and will be discouraged to find that conventional document processing machines for EDP handling are unable to reliably handle both document sizes satisfactorily. The present invention provides an answer to this problem by prescribing improved document pocketing means for sorting, and like processing, machines, being adapted to handle documents of widely-varying size and weight with simple minor adjustment. This improvement includes stack transport segments and stop means readily adjustable (in "effective length" and position, respectively) for different-length documents.

In such machines, one special problem has been the "mating" of the customary pusher-plate in a stacking pocket with a position-variable transport stop so these both work effectively, yet compatibly. According to one embodiment of this invention, the stacking-means has been simplified to comprise, essentially, a mere flexure-plate stop, made slideable along the locus of stacking-transport, together with a pusher-plate which has been cut-out to accommodate these stop-plate translations, while yet extending along the locus of maximum card length. This arrangement is combined with a stacking transport of extremely simple design, for instance, comprising (in one embodiment) transport belts, the stacking-segments of which are easily translated to different positions for thereby defining different stack-transport lengths (corresponding to different document lengths). This translation is effected simply by trapping these belts between a pair of idler pulleys and sliding the pulley pair along the stacking plane on the frame which mounts the aforementioned plate. Here, also the pusher plate is provided with an extension arm spanning the differential in document length and coacting with the lower stack belt, the stop plate being configured to clear this arm. Preferably, the pusher plate is tilted, vertically, bottom-in, to urge its bottom portions toward the lower stacking belt and thereby engage lower document portions into stacking-transport engagement, preferentially. In a related feature the pusher-plate is also tipped laterally-in to converge with the belts adjacent the stop-plate and thereby create a slightly-convergent stacking "funnel." The stop-plate is also, preferably, made flexible and preflexed dampingly.

Thus, it is an object of the present invention to alleviate the aforementioned problems and provide the aforementioned, and related, features of novelty and advantage.

Figure 2:
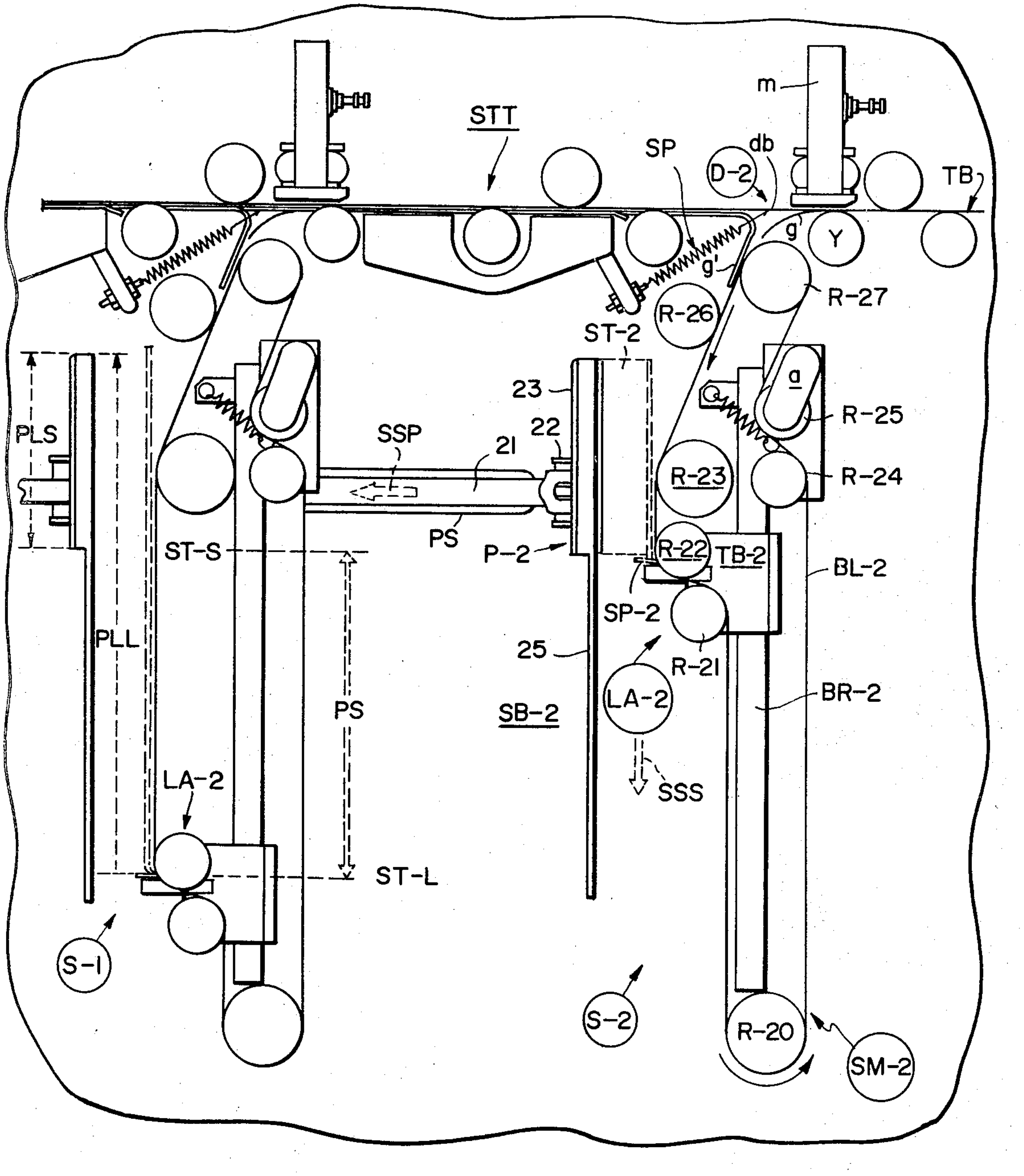
Figures 3, 4, 5, 6, 7:
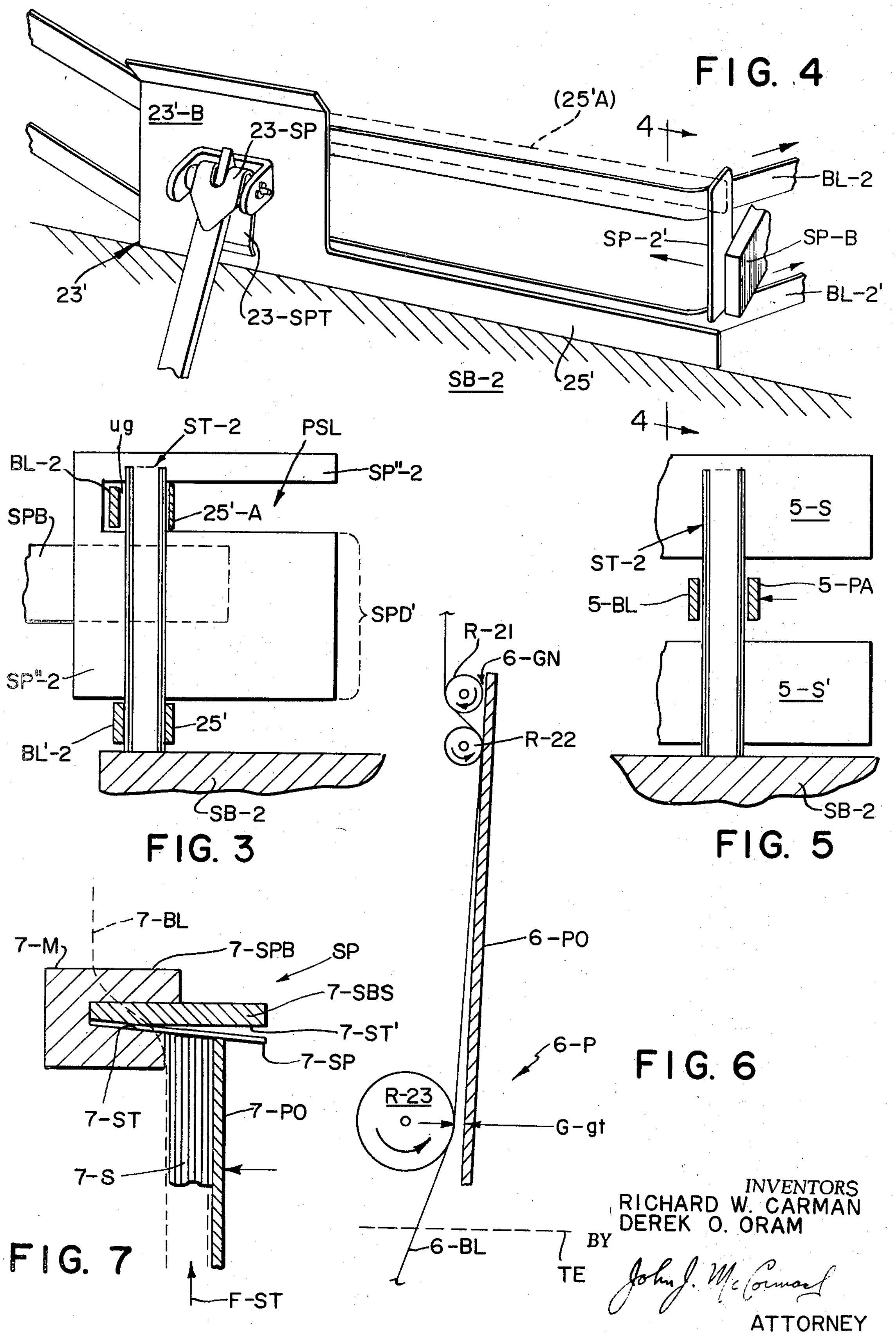

The above novel features and advantages are provided and illustrated in a variable-length document handling apparatus embodiment including improved pocketing assembly (for each sort-stacking pocket), this assembly comprising a stacking transport which is translatable so that its effective-stacking length is selectively variable, to accommodate different-length documents, a repositionable portion of this transport being mounted for translation in common with a flexible stop-plate together with a maximum-length pusher-plate which is cut-out to accommodate the passage of this stop-plate. A sorting machine apt for using the invention will be found described in copending commonly-assigned U.S. application S.N. 695,-177, to Dempsey, filed Jan. 2, 1968, now Pat. 3,502,323 issued Mar. 24, 1970. The above, and other novel features of the invention as well as further objects and advantages will become apparent to those skilled in the art from the following detailed specification with reference to the accompanying drawings wherein like reference symbols denote like elements, the drawings comprising:

FIG. 1, an upper schematic isometric view of a variable-length stacking portion of a document-handling machine including an embodiment of the invention;

FIG. 2, a schematic (skeletal) plan view of pair of sort-pocket stacking units, each like the embodiment of FIG. 1, the pockets respectively illustrating the stacking of long and short documents;

FIG. 3, an end view of a card-stop arrangement like that in FIGS. 1 and 2, but modified somewhat together with a sectional showing of a modified transport belt-pusher arm arrangement in relation with;

FIG. 4, a schematic front elevation of the positionable transport-stop arrangement in FIGS. 1 and 3, with a modified pusher arrangement suggested in phantom;

FIG. 5, a view like FIG. 3, however, with a single-belt, single pusher extension and double stop-plate arrangement;

FIG. 6, a schematized plan view of the pusher extension and associated section of a stacking belt in FIGS. 1 and 2, indicating a preferred convergent lateral relation thereof; and FIG. 7, a schematized, simplified plan view of a preferred form of the card stop arrangement in FIGS. 1 and 4.

The features of invention to be described will be understood as generally involving improved arrangements for stacking documents at high speeds in document handling machines, especially where a number of widely disparate document lengths must be handled. One such machine is part of an optical character recognition (OCR) system in cluding a document transport control unit, etc. operable "ON-Line" with a modern high speed electronic computer at very high speeds. Such a system is adapted to process "OCR Documents" having the following wide range of (nominal) dimensions:

Document height—3–4 inches.
Length—3½–8 inches.
Thickness—4–7 mils.

Accordingly, the transport associated with this OCR system must operate in "demand-feed mode" at a rate of about 1200 (minimum length) documents per minute, at a document velocity of about 100 in./sec., stacking about 4 inches of documents (maximum stack width) in each sort pocket. Other characteristics of such a transport and associated problems are discussed in the aforementioned patent application to Dempsey, incorporated by reference herein. The features of invention will be described with reference to there embodiment in a stacking sort-pocket typical of such an OCR machine and fed by a sort-transport arrangement STT therein.

SORT-TRANSPORT, GENERALLY

FIG. 2 shows, in plan view, a pair of sorts pockets S–1, S–2 together with a representative portion of the OCR sort-transport arrangement STT referred to above. Sort-transport STT will be understood as generally adapted to advance document down a prescribed transport path by a transport belt system to be selectively diverted into a prescribed one of the pockets, and may be understoods as conventionally implemented as known by those skilled in the art, execpt where otherwise indicated. Thus, the illustrated, exemplary portion of transport STT comprises a (double) sort-transport belt arrangement TB and a number of cooperating rolls and guides, plus diverter means arranged (conventionally) along the belt path, one for each sort-pocket. Each diverter may be selectively interposed for diverting a document from this transport path into an associated sort-pocket (e.g. diverter D–2 including blade *db* for pocket S–2), the document thereafter being stacked (pocketed) by a respective pocketing transport (e.g. SM–2 for pocket S–2). It will be understood that here and alsewhere most elements are not drawn to scale and for clarity have some parts emphasized and others deemphasized, modified or eliminated as to better convey the principles of the invention to those skilled in the art. Each diverter unit D may be understood as conventional, generally comprising a magnet *m*, spring SP and diverter blade *db* which is selectively pulled into the transport path (such as by bias spring SP, upon release thereof by hold magnet *m*, or the like). For instance, the tip of this blade be inserted between transport belts TB so as to guidingly divert an approaching document off the belts and between guide members *g*, and into engagement with the pocketing-belts of pocketing-transport SM (e.g. belts BL–2 in pocket S–2). The diverting arrangement and other elements associated with each sort pocket S will be understood as similarly implemented, these being now described in more detail below.

POCKETING UNIT

A representative pocketing arrangement including a transport assembly SM–2 and associated means will now be described for representative pocket S–2, seen in FIGS. 1 and 2. Each stacking assembly SM generally comprises stacking belt means BL, and associated driving/directing rolls, together with a position-adjustable "length-adjust" means LA including a pair of belt-trapping idler rolls (e.g. R22, R–21 for LA–2, both being mounted on a frame TB–2 to be slidingly positionable along a guide rail BR–2). Pocketing transport SM–2 particularly comprises a pair of stacking belts BL–2, BL–2′ (preferably two or more continuous resilient document-advancing webs, as known in the art) arranged to be driven along a prescribed pocketing path by one, or several, of a set of associated rolls R–20, R–23, R–24, R–27, being entrained about tensioning roll R–25. Belts BL–2, –2′ are also entrained about "offset" Roll R–23 and a movable pair of trap-rolls R–21, R–22, to define a stacking plane therebetween. Offset roll R–23 also acts to give the document an advance component in the stack-pushing direction SSP as well as in the stacking direction SSS (see arrows). Belts BL are also diverted for tensioning and friction-drive by resiliently-biased idler roll R–25 (on spring-biased arm *a*), with roll R–24 disposed to divert the belt to clear to foremost excusion of the length-adjusting assembly LA–2 (discussed below). Roll R–26 is provided to engage incoming documents against belts BL.

The length-adjust means LA is adapted for changing the effective (stacking-stopping) length of the stacking unit, to thereby accommodate different document-lengths. For instance, length adjust means LA–2 for pocket S–2 will be understood as comprising belt-trapping idler rolls R–21, R–22 and a stop-plate means SP–2, all mounted from a common frame TB–2, adapted to be slidingly positionable along an associated guide rail BR–2 (or equivalent means as evident to those skilled in the art). Each of the rolls R–21, 22 comprises an upper and lower drum, one for each belt (as with the other rolls), these being rotatably mounted on frame TB–2, with one (forward) roll R–22 disposed in prescribed relation with the other (directing) roll R–23 to direct the intermediate ("stacking") belt segment relatively along a prescribed stacking direction (this direction being preferably slightly skewed away from stack-direction SSS a few degrees, toward push-direction SSP). It will also be understood that stop-plate SP–2 is so projected from frame TB–2 as to intercept documents proceeding along this stacking segment in a resilient arresting manner, thus establishing a reference stop-position, such as "sort-stop" axis ST–*s* for arrestment of "minimum-length" documents and analogous "long-stop" axis ST–1 for arrestment of maximum-length documents. Plate SP–2 may comprise an elongate flexure plate (spring) or like resilient piece between belts cantilevered out from TB–2 BL and dimensioned to intersect most of a document across section as well as reference a stack (of prescribed maximum width) therealong. For instance, as seen in FIGS. 1, 3 and 7, plate SP–2 is slightly wider than the maximum stack thickness (4 inches) and extends, in height, from adjacent the top of a maximum-height document down to adjacent the hopper bed SB–2; however, terminating somewhat short of this to accommodate the "outrigger" extension 25 of pusher-plate 23 (described below 3. Blade SP–2 may be formed of spring steel, stamped polypropylene, flexible nylon, a collapsible spring or the like. This blade should project past the incoming card path, and beyond the extreme (full stack) locus of blade 23 (extension 25 thereof), sufficient to provide a flexible closure, trapping the documents, i.e. decelerating them efficiently and preventing them from escaping from the stack without damage—as well as muffling any attendant stacking impact noise.

Frame TB–2 will be understood as mounted for selective translation along the stacking direction SSS, carrying idler rolls R–21, R–22 and stop assembly SP along the adjust segment PS (i.e. stop SP between the aforementioned extreme stop-axes ST–S and ST–L). Any convenient mounting arrangement may be provided for this, such as slide bar BR–2 adapted to slideably receive a mating portion of mount TB–2 for sliding therealong during "length-adjust." Each stacking assembly SM may also be understood as enclosed in a housing (not shown) with the length-adjust assembly LA preferably adapted to be operator-translated through an up-projecting handle arranged for securing assembly LA to the housing (or bar to BR, etc.) anywhere along the adjust segment PS (FIG. 2).

Such a housing may be mounted detachably on pillars PT, PT' (FIG. 1).

The operation of adjust assembly LA–2 will be appreciated by comparing its position with companion assembly LA–1 in FIG. 2. That is where the stack ST–2 of "short" (minimum length) documents in pocket S–2 requires moving LA–2 to set stop-plate SP–2 along the "short-stop" axis ST–S; the comparable stack ST–1 in pocket S–1 contains "long" document (maximum length) such as to require translation of the associated adjust mount LA–1 so that its stop-plate SP–1 registers with the "long-stop" axis ST–L, as indicated, In any case, it will be appreciated, of course, that the adjusted stop-length of such a sort-pocket (the position of plate SP) will be document-tailored; that, is, the operator will so locate assembly LA so that the trailing of the "last" document stacked (the document next to belts BL) will locate far enough "forward" (along stacking direction SSS) to clear idler roll R–26, yet not so far forward as to "trap" the next incoming document (and destroy the stacking order, etc.).

It will be appreciated that such a length-adjust assembly LA can perform many advantageous functions, such as selectively controlling the effective stacking length of belts BL (e.g. making this length sufficient to extend substantially forward along the document and thus draw it into the stack ST, rather than pushing it—something especially useful in the case of thin flimsy sheets, which may otherwise be bent, crumpled, etc.). This adjustment can assure that incoming documents are urged positively against stop SP–2 and continually thrust thereto keep so registered, yet without driving them hard enough to damage or crumple them, etc.

Pusher body 23–B is coupled to thrusting (spring-biased) push arm 21 by a pivot coupling 22 adapted to pivot it about the stacking direction. Coupling 22 includes a coupling spring-plate 23–SPT contrained to urge the bottom edge of plate 23 toward the documents, thus "kicking them in" against lower stack belt BL–2 in an improvement feature.

The foregoing functional description of the elements in sort-pocket S–2 will, of course, be equally applicable to other sort-pockets (e.g. S–1). Similar pocketing and related elements may be seen in more detail, and in alternative form, in a co-pending, commonly assigned U.S. patent application, S.N. 515,995 to Eveland et al., filed Dec. 23, 1965 and incorporated by reference herein.

PUSHER BLADE

As best seen in FIGS. 1 and 4, a pusher blade 23 is provided for each pocketing unit and may be generally understood to have a conventional structure and operational purpose except for the following novel features. Thus, blade 23 comprises a main, flat body portion 23–B including an upper lip 23–L adapted to provide convenient access to documents stacked there-against. Body 23–B is constructed to generally conform to the height and length of the "shortest-length" document anticipated, having a prescribed length PLS (FIG. 2). Body 23–B will preferably extend up a substantial portion of the expected card height to maintain stacked documents upright (keeping them from toppling over) and, in some cases, to maintain their upper portions engaged for translation with a portion of upper stacking belt BL–2, preventing vertical document skew (lift-up) or the like. Pusher plate 23 is attached to a relatively conventional pusher arm 21 projected through associated hopper bed SB–2 through a respective slot PS therein and pivotally, mounted therebelow, being conventionally spring-biased to effect the prescribed pushing thrust on a document stack interposed between the plate and the respective stacking belt BL.

According to a feature of the invention, plate 23 also includes an extended portion of reduced height (or "outrigger") adapted to accommodate maximum-length documents, while yet being slotted, or cut-out, to accommodate the passage of the stop means (plate SP–2) when assembly LA–2 is translated for documents of less than maximum length. Thus, in the illustrated preferred embodiment, this extension takes the form of a single, bottom outrigger plate 25 adapted to thrust documents longer than the main body (23–B) adjacent lower belts BL–2' in the usual manner to be fully stack-thrust thereby. Plate 25 extends beyond 23–B a prescribed distance (25–L), slightly longer than maximum-document length, and beyond the plan of stop plate SP–2 to assure full (stop-contacting) transport engagement with lower belt BL–2' for every document.

According to this feature, extension 25 has a height (25–*h*, FIG. 1) approximately that of belt BL–2' (to engage documents thereagainst for stack-transport) and a prescribed length (25–L) corresponding to the longest document (here, extending the short-card-width of body 23–B, about 3 inches, about 2½ times, to about 8 inches). This feature facilitates an unusually large length-differential and could accommodate an even longer differential (e.g. about 4–5 times the shortest length) providing the pocketing unit with a length-handling capability of unusually broad range. Of course, a like extension may be provided where the corresponding document portions are to be engaged with upper belt BL–2 (e.g. so as to be kept aligned upright, etc.). Such is indicated in phantom as outrigger 25'A projected from main pusher body 23'–B, along with lower outrigger 25'. Upper extension 25'–A will span associated belt BL–2 and extend beyond stop plate SP–2', preferably (the latter being understood as cut-out accordingly for this). Such a pair of upper and lower outriggers is indicated at 25'–A, 25' respectively in FIG. 3 along with an associated modified stop plate SP''–2, and a pair of cooperating stacking belts BL–2, BL'–2, respectively, plus an intermediate, exemplary document stack ST–2. Stop-plate SP''–2 is cut-out at PSL to accommodate upper outrigger 25'–S and projects a lower blade portion of height SPD' between the two outriggers.

According to another feature the pocketing unit is adapted to pull documents in (and not push them) along their lower edge portions, with relatively little (or no) thrust along upper portions. This feature is accommodated by the aforementioned "kicking-in" of the pusher-plate (with spring plate 23–SPT) and is important with the indicated "bottom outrigger" construction. We have observed that unless the lower document portions are so "pulled," documents are often misstacked, in some cases being skewed upward and even ejected out of the stack or "sky-ed," when their upper portions are thrust. Another implementation of this "bottom-pulling" mode is indicated for the double-outrigger pusher plate in FIG. 3. Here, upper belt BL–2 is purposely offset a prescribed gap distance "*ug*," out of any significant contact with the document stack ST–2, at least along the forward stacking-belt segments (adjacent stop assembly SP).

According to a related feature, illustrated in FIG. 6, the stacking belt segment (between rolls R–23, R–22) also laterally is skewed "mergingly," with respect to the pusher blade surface 6–PO, converging toward engagement with it in the "forward" stacking direction. For instance, with no stacked documents in this pocket roll R–23 may be set back to established a prescribed gap G–*gt* (e.g. order of 30 mil) between plate 6–PO and the belts (e.g. 6–BL), but virtually no gap adjacent roll R–22 (6–GN is zero). This "converging" belt-pusher attitude is helpful in assuring that documents are pulled, not pushed, to the stop plate, and in releasing the tails (trailing edges) of stacking documents as they impact the stop plate (e.g. to swing away from the belts, of their own resiliency, and "clear" any following injected documents). The typical tail locus is along axis TE. This "converging belt" attitude combined with the aforedescribed "bottom-pull" feature provides a much improved stacking belt arrangement, e.g. assuring more reliable, stable stacking action, especially with the aforementioned "bottom-outrigger" (pusher-plate) embodiment. The superior results in pulling documents (vs. pushing them) will be appreciated by anyone who has tried to "push a load with a rope" since a rope, like most OCR documents, is taut under pulling tension, but buckles under compression, of course.

Of course, other forms of the outrigger (or extension arm) construction may be visualized, such as the "middle-outrigger" form 5–PA indicated in FIG. 5, engaging document stack ST–2 against associated single stacking belt 5–BL. Here, the stop means is accordingly modified to (as before) provide the largest possible stopping area (minimum impact pressure), comprising a pair of upper and lower stop plates 5–S, 5–S′, spaced apart to accommodate outrigger 5–PA.

According to a further improvement feature the stop assembly SP is constructed as indicated in FIG. 7 to provided a damped, limited stop-plate 7–SP. Here, the arrangement will be understood as similar to the foregoing except for improvement features, plate 7–SP being intended to gradually arrest documents stacked (e.g. in stack 7–S) between a belt system (7–BL, in phantom) and pusher plate 7–PO, as before. However, plate 7–SP is bent (preflexed) somewhat against a first stop surface 7–ST by a stop bar 7–SBS affixed in the overall stop mount 7–SPB. Bar 7–SBS thus serves to preflex stop plate 7–SP and to damp out document "overthrusts" and eliminate resultant "chatter" and similar noisy oscillations of plate 7–SP (e.g. when excess engagement force due to variations in belt thickness, document-thickness, etc. causes excessive impact thrusts on plate 7–SP. Such overthrusts can even "walk" documents up, out of the stack)! Bar 7–SBS also provides a stop-limit surface 7–ST′ limiting the flexing excursions of plate 7–SP and keeping the arrested documents properly registered.

Workers in the art may visualize other alternative forms of constructing a pusher plate according to the aforegoing feature whereby it provides support for longer stacked documents and yet is adapted to "clear" the passage of a document stop means like plate SP, also being "kicked-in" for "bottom-pull" of the stacked documents, preferably.

While in accordance with the provisions of the patent law, the foregoing illustrates and describes certain embodiments of the invention and their mode of operation, it will be apparent to those skilled in the art that changes may be made in the apparatus described without departing from the spirit and scope of the invention as set forth in the appended claims and that in some cases, certain features of the invention may be used to advantage or modified without corresponding changes in other features while certain other features may be substituted for, or eliminated, as appreciated by those skilled in the art.

Having thus described the invention, what is claimed as new and desired to be secured by Letters Patent is:

What is claimed is:

1. A document stacking arrangement including a stacking transport adapted to thrust injected documents along a prescribed stacking plane between an inject portion and a stop portion thereof; and pusher means having an orientation relative to said transport means so that documents are pulled along said stacking plane, said pusher means being adapted to urge said documents towards this plane resiliently, said transport means and pusher means being adapted to handle a prescribed range of document lengths, said transport means being arranged to be translatable so that said stop portion thereof assumes a selectable stop position corresponding to a respective one of these document lengths along said pusher means, thereby referencing all document tails along relatively the same tail-locus, whatever their length; said pusher being arranged to span this length differential and so urge longest and shortest documents relatively the same, being relieved to admit said adjusting translations of the transport means, said orientation constituting a lateral tilt whereby the transport plane converges with said pusher means in the direction of said stopping portion so as to, effectively, engage at the selected stopping location.

2. The combination as recited in claim 1, wherein the lateral tilt establishes a maximum gap between said pusher means and said transport means on the order of a few mils.

3. The combination as recited in claim 1, wherein said orientation comprises a vertical tilting adapted to drive documents preferentially from adjacent their bottom portions.

4. The combination as recited in claim 3, wherein said pusher means comprises a pusher plate and a resiliently thrusting arm coupled thereto; and wherein said vertical tilt is provided according to flexure coupling means between said pusher plate and said thrusting arm therefor.

5. The combination recited in claim 3, wherein said orientation also includes a lateral tilt whereby the transport plane converges with said pusher means in the direction of said stopping portion so as to effectively engage at the selected stopping location.

6. A document stacking arrangement including a stacking transport adapted to thrust injected documents along a prescribed stacking plane between an inject portion and a stop portion thereof; and pusher means arranged to cooperate with said transport means, said pusher means including at least one expansion portion projecting therefrom along said stacking plane and being adapted to urge said documents towards this plane resiliently, said transport means and pusher means being adapted to handle a prescribed range of document lengths, said transport means being arranged to be translatable so that said stop portion thereof assumes a selectable stop position corresponding to a respective one of these document lengths along said pusher means, thereby referencing all document tails along relatively the same tail-locus, whatever their length; said pusher being arranged to span this length differential and so urge longest and shortest documents relatively the same, being relieved to admit the said adjusting translations of the transport means, said pusher means further including a primary plate and at least one outrigger extension arm projecting therefrom, said plate having height and width dimensions approximating those of said "shortest" document, said arm having a length adapted to span said "longest" document and a height to clear said adjustably-positionable stop means.

7. The combination as recited in claim 6, wherein said outrigger arm comprises a single extension arm disposed to urge only the bottom portion of said documents toward confronting portions of said transport means.

8. The combination as recited in claim 7, wherein said pusher means is also adapted to be vertically tilted with respect to said stacking plane and provided with resilient bias means adapted to thrust lower portions out and thereby urge bottom portions of said documents relatively more towards said plane.

9. The combination as recited in claim 8, wherein said transport means comprises a pair of stacking belts and a multi-length-adjust belt directing assembly including stop means projected from said assembly so that the stop means and the effective length of said stacking belts may be selectably position-referenced to accommodate different length documents; wherein the said primary pusher plate is dimensioned to approximately span both belts and said "shortest" document; wherein said bottom outrigger arm is adapted to approximately span the lower belt, said stop means being configured to clear said outrigger arm during said position referencing and to project away from said stacking plane sufficient to provide a stack-referencing stop/guide for documents in a stack of prescribed maximum width.

10. The combination as recited in claim 8, wherein said pusher means comprises a pusher plate and a resiliently thrusting arm coupled thereto; wherein said vertical tilt is provided according to flexure coupling means between said pusher plate and said thrusting arm therefor; wherein said orientation comprises a lateral tilt whereby the transport plane converges with said pusher means in the direction of said stopping portion so as to effectively, engage at the selected stopping location; this lateral tilt being arranged to establish a maximum gap between said pusher means and said transport means on the order of a few mils.

11. The combination as recited in claim 10, wherein said stop means comprises a resilient stop plate adapted to intersect a substantial portion of the stacking plane to define a reference stop axis therealong, this resilient plate being adapted to resiliently absorb the impact of documents thrust along this plane and stop them, being also arranged to be preloaded against a damping means to minimize unwanted oscillations thereof from excess impact thrusts.

12. The combination as recited in claim 11, wherein said stop plate comprises a resilient flexure plate intersecting a major portion of the stacking plane, also being dimensional and projected somewhat toward the compliant direction of said pusher means to further act as a guide for said stacked documents along said reference axis, said plate being preflexed in the direction of incoming documents to effect said preloading.

13. The combination as recited in claim 6, wherein said transport means includes stop means comprising a resilient stop plate adapted to intersect a substantial portion of the stacking plane to define a reference stop axis therealong, this resilient plate being adapted to resiliently absorb the impact of documents thrust along this plane and stop them, being also arranged to be preloaded against a damping means to minimize unwanted oscillations thereof from excess impact thrusts.

References Cited

UNITED STATES PATENTS 3,281,147 10/1966 Misbin -------------- 271—87

EDWARD A. SROKA, Primary Examiner